United States Patent [19]

Hoshino

[11] Patent Number: 5,653,160

[45] Date of Patent: Aug. 5, 1997

[54] SYSTEM FOR HEATING FOOD STUFFS

[75] Inventor: Hiroshi Hoshino, Tsuchiura, Japan

[73] Assignee: Frontier Engineering Co., Ltd., Tokyo, Japan

[21] Appl. No.: 662,009

[22] Filed: Jun. 12, 1996

[30] Foreign Application Priority Data

Jun. 14, 1995 [JP] Japan .................. 7-147043

[51] Int. Cl.$^6$ .................. A23L 1/325; A23L 1/01; A23P 1/00

[52] U.S. Cl. .................. 99/358; 99/443 C; 99/451; 99/477; 99/483; 99/DIG. 14

[58] Field of Search .................. 99/353–355, 358, 99/386, 443 C, 451, DIG. 14, 483; 426/523, 234–238, 241, 244, 245, 513; 219/771–776, 780, 705

[56] References Cited

U.S. PATENT DOCUMENTS

| | | | |
|---|---|---|---|
| 4,685,877 | 8/1987 | Harada | 99/461 X |
| 4,807,524 | 2/1989 | Ikeuchi et al. | 99/353 |
| 5,048,405 | 9/1991 | Takahashi et al. | 99/470 |
| 5,333,538 | 8/1994 | Sawa | 99/353 |

FOREIGN PATENT DOCUMENTS

| | | |
|---|---|---|
| 4-27365 | 1/1992 | Japan . |
| 7-274907 | 10/1995 | Japan . |
| 8-56621 | 3/1996 | Japan . |
| 8-70824 | 3/1996 | Japan . |

*Primary Examiner*—Timothy F. Simone

[57] ABSTRACT

There is disclosed a heating system for producing food stuffs such as a paste food stuff having minced flesh of fish meat as a raw material. The heating system comprises: an electrode row or rows, in which a plurality of roller electrodes are disposed in parallel to one another; and a water permeable film or films trained across the roller electrodes making up the electrode row or rows. The food stuffs are conveyed by the movement of the water permeable film or films and electrical power is supplied to the roller electrodes in such way that electric current flows between pairs of the roller electrodes along current paths extending through the water permeable film or films and the food stuffs to make the food stuffs generate Joule heat. With this arrangement, the food stuffs are quickly heated. The food stuffs are also guided by the water permeable film or films.

10 Claims, 11 Drawing Sheets

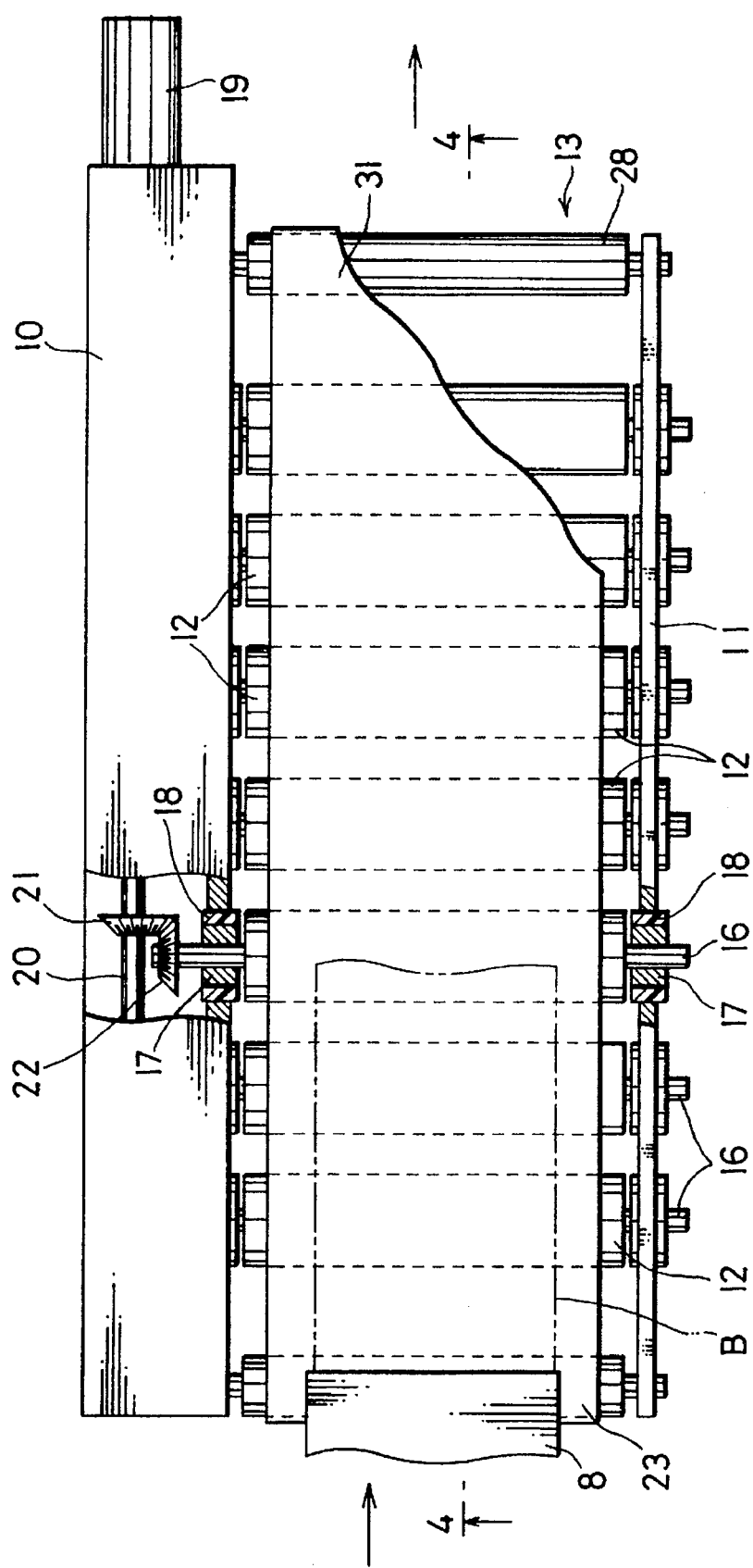

SYSTEM FOR HEATING FOOD STUFFS

BACKGROUND OF THE INVENTION

1. Field of the Invention

This invention relates to a system for heating food stuffs in order to manufacture a crab meat tasting boiled fish paste (hereinafter referred to as "kanifu-kamaboko"), a bamboo leaf shaped boiled fish paste (hereinafter referred to as "sasa-kamaboko"), a cylindrical boiled fish paste (hereinafter referred to as "chikuwa"), a wooden-soled boiled fish paste (hereinafter referred to as "itatsuki-kamaboko") and so forth, which are mainly constituted by minced flesh of fish meat as a raw material for example.

2. Description of the Related Art

As the food stuffs mainly constituted by the minced flesh of fish meat as the raw material, there are kanifu-kamaboko, sasa-kamaboko, chikuwa, itatsuki-kamaboko and so forth. These paste food stuffs are produced by forming a paste-like minced flesh of fish meat, which is obtained by mincing the fish meat into various shapes. The kanifu-kamaboko uses the minced flesh of the fish meat as the raw material and is produced by forming to provide a belt shape which has a multitude of slits therein. The itatsuki-kamaboko is produced by mounting the minced flesh of the fish meat onto a rectangular plate, and the chikuwa is produced by winding the minced flesh of the fish meat around a rod member.

These food stuffs are heated for holding a predetermined shape and for sterilization after these food stuffs are formed to provide predetermined shapes, using the minced flesh of the fish meat as the raw material. Ordinarily, for this heating, a steamer is used to heat the food stuffs with steam. However, if these paste food stuffs are heated with steam, it takes much time for heating and a large-sized heating system is required.

Then, there has been developed such a heating system, in which an electric current is flowed through the minced flesh which has been formed in a state of being clamped between electrodes, the minced flesh is heated by Joule heat, whereby the minced flesh is heated to a predetermined temperature.

Japanese Patent Kokai (Laid-Open) No. 27365/1992 discloses a system for heating food stuffs invented by the inventor of the present application, in which two endless belt type electrodes are used, and the food stuffs are conveyed in a state of being clamped between these electrodes, whereby the food stuffs are heated. When a thin belt-shaped minced flesh is heated by use of the belt-shaped electrodes, it is not easy to maintain the thickness of the belt-shaped minced flesh to a predetermined thickness.

SUMMARY OF THE INVENTION

It is an object of the present invention to provide a system for heating, which is capable of continuously heating and sterilizing paste food stuffs constituted by minced flesh of fish meat as a main raw material while conveying the food stuffs. It is another object of the present invention to provide a system for heating, which is capable of heating food stuffs in a short period of time.

It is a further object of the present invention to provide a system for heating, which is capable of heating and sterilizing food stuffs to a predetermined temperature within a short conveying distance.

The present invention relates to a system for heating the paste food stuffs formed by mincing the fish meat as the main raw material and comprising: a roller electrode row, in which a plurality of roller electrodes each formed of an electrically conductive material are disposed at predetermined intervals in parallel to one another; an electric power source for supplying electric power to each of the roller electrodes; a water permeable film racked across the roller electrode row, for guiding the food stuffs and in contact with the food stuffs; and a means for supplying the food stuffs to the input side of the roller electrode row, so that an electric current is flowed through the food stuffs via the water permeable film between pairs of roller electrodes to generate Joule heat in the food stuffs, to thereby heat the food stuffs.

By use of this heating system, it is possible to heat the food stuffs formed to provide belt shapes and further process the food stuffs to form the kanifu-kamaboko. Furthermore, the food stuffs which have been formed to provide predetermined shape, such as sasa-kamaboko, may be heated.

The present invention relates to a system for heating the paste food stuffs formed by mincing the fish meat as the main raw material and comprising: a first roller electrode row, in which a plurality of roller electrodes each consisting of an electrically conductive material are disposed in parallel to one another at predetermined intervals; a second roller electrode row, in which a plurality of roller electrodes each consisting of an electrically conductive material are disposed in parallel to one another at predetermined intervals and forming predetermined spaces with the surfaces of the first roller electrode row; an electric power source for supplying electric power to each of the roller electrodes; a first water permeable film racked across the first roller electrode row, for guiding the food stuffs is in contact with the food stuffs; a second water permeable film racked across the second roller electrode row, for guiding the food stuffs in contact with the food stuffs; and a means for supplying the food stuffs to the side of convey-in of the roller electrode row; so that an electric current is flowed through the food stuffs via water permeable films between pairs of roller electrodes to generate Joule heat in the food stuffs, to thereby heat the food stuffs.

The roller electrodes of the first roller electrode row and the roller electrodes of the second roller electrode row are disposed in the vertical direction, respectively, and conveyors for conveying the food stuffs are disposed at the under sides of spaces formed between the respective roller electrode rows, whereby the itatsuki-kamaboko formed by mounting the food stuff material onto the rectangular plate may be heated.

BRIEF DESCRIPTION OF THE DRAWINGS

FIG. 3 is a plane view showing the system for heating food stuffs as an embodiment of the present invention.

DESCRIPTION OF THE PREFERRED EMBODIMENT

Figure 1:
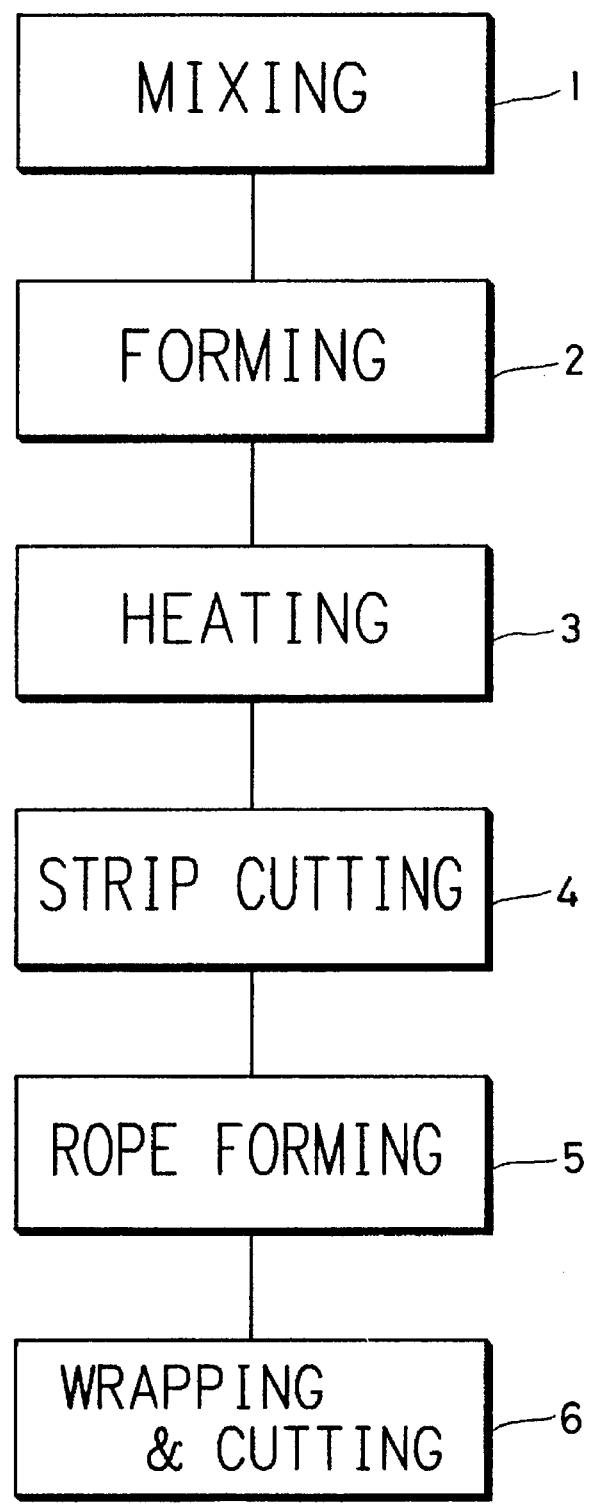
FIG. 1 is a flow chart showing the manufacturing process for producing the kanifu-kamaboko.
Figure 2A:
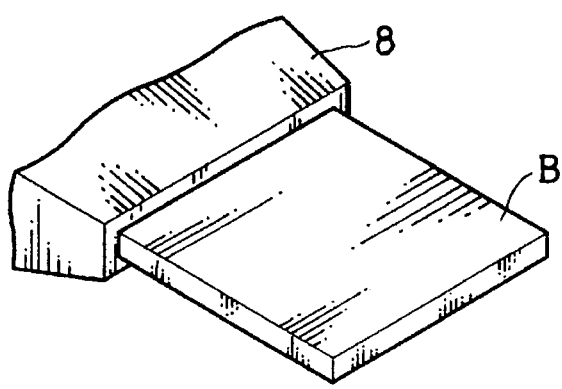
FIGS. 2a to 2c are oblique views showing the state of processing of the kanifu-kamaboko.
Figure 2B:
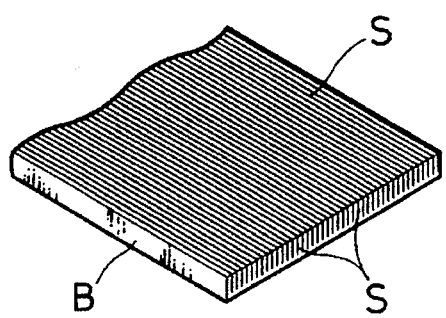

A process of producing the kanifu-kamaboko is shown in FIG. 1, in which fish meat is minced, and the minced fish meat is mixed with a condiment such as table salt, so that a raw material for the paste food stuff made of a paste of minced flesh can be produced. This raw material for the paste food stuff is continuously pressed out from a nozzle shown in a FORMING process 2 to form a belt-shaped food stuff. In FIG. 2a, there is shown a belt-shaped food stuff B pressed out from a nozzle 8 and formed. The thus formed belt-shaped food stuff B maintains its shape, is heated in a HEATING process 3, and then, cooled. In the thus cooled belt-shaped food stuff B, a multitude of slits are formed at a predetermined thickness by a cutter having a multitude of blades on the surface of the belt-shaped food stuff in a STRIP CUTTING process 4. FIG. 2b shows a state, in which a multitude of slits S are formed on the belt-shaped food stuff B.

Figure 2C:
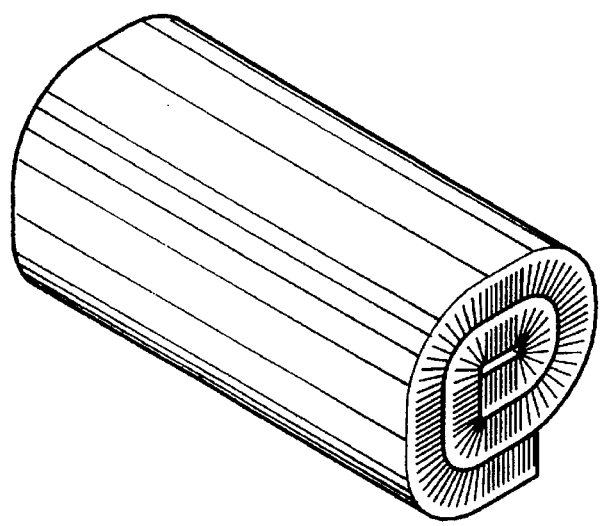

Subsequently, in a BINDING process 5, the belt-shaped food stuff is formed to provide a rod shape with the outer surface side formed with the slits S being positioned at the inner side and the near surface side not formed with the slits S being positioned at the outer side. When the rod-shaped food stuff is wrapped and cut a predetermined length, the kanifu-kamaboko having a crab meat shape is produced as shown in FIG. 2c.

Figure 4:
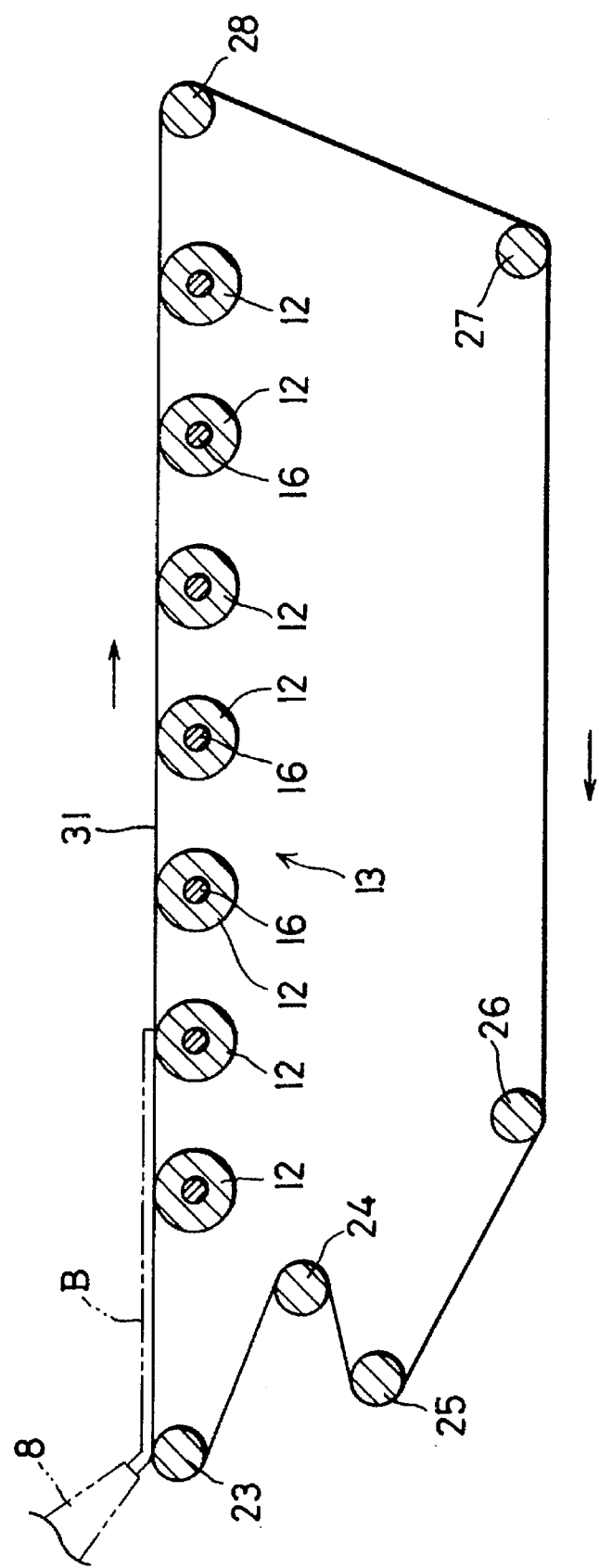
FIG. 4 is a sectional view taken along the line 4—4 in FIG. 3.

FIGS. 3 and 4 are drawings showing the heating system used in the heating process for heating the belt-shaped food stuff. As shown in FIG. 3, the heating system has two support members 10 and 11 which are extending in the horizontal direction in parallel to each other. On these support members 10 and 11, there are rotatably mounted a plurality of electrodes 12 extending in the horizontal direction in parallel to one another at predetermined intervals. As shown, seven roller electrodes 12 are provided, which constitute the electrode row 13.

The respective roller electrodes 12 are secured to shafts 16, and the respective shafts 16 and roller electrodes 12 are formed of electrically conductive metal materials. However, as the case may be, only the outer peripheral portions of the respective roller electrodes 12 may be formed of conductive metals.

As shown in FIG. 3, opposite end portions of the respective shafts 16 are supported by metallic bearings 17, the respective bearings 17 are fixed to the support members 10 and 11 through electrically insulated rings 18, and the respective roller electrodes 12 are electrically insulated from the support members 10 and 11.

In order to rotatably drive the respective roller electrodes 12, a driving shaft 20 for being rotated by a motor 19 secured to the support member 10 is mounted on the support member 10, and a bevel gear 21 fixed to this driving shaft 20 is in mesh with a bevel gear 22 secured to the shaft 16. With this arrangement, all of the roller electrodes 12 are rotatably driven by the motor 19 in the same direction at the same number of revolutions. However, such an arrangement may be adopted that sprockets are secured to the respective shafts 16, and a chain trained across these sprockets is driven by a motor, so that the roller electrodes are rotatably driven.

As shown in FIG. 4, a guide roller 23 positioned at the inlet side is disposed at the input end of the roller electrode row 13 in parallel to the roller electrodes 12, the other guide rollers 24 to 27 are disposed downwards of the roller electrode row 13, and a guide roller 28 positioned at the outlet side is disposed at the output end of the roller electrode row 13. The guide roller 25 is shifted in the horizontal direction, whereby the tension of a water permeable film 31 is adjusted.

The endless water permeable film 31 is trained across the guide rollers 24 to 28 and the electrode row 13. As shown in FIG. 3, this water permeable film 31 has a width slightly narrower than the length of the roller electrode 12 and is supplied with water. The water permeable film 31 may be any one, only if it is any film-shaped or sheet-shaped one which has the characteristics of absorbing water such for example as cellophane, paper, fabric and nonwoven fabric. Ordinarily, various film materials and sheet materials, which are referred to as a hydrophilic film, a film having susceptibility to water, a film having water retention characteristics or the like, may be used, and these materials are named generally as the water permeable films. A fabric is used as a water permeable film shown herein.

The roller electrodes 12 are driven by the motor 19, whereby the water permeable film 31 is followingly driven in a direction indicated by an arrow in FIG. 4 to be moved from the input end to the output end, so that the food stuff is guided by this water permeable film 31. As illustrated, only one water permeable film 31 is used. However, two or more water permeable films 31 may be used.

As shown in FIG. 4, a push-out nozzle 8 is provided at a position upwardly of the end of carry-in of the water permeable film 31, whereby the paste food stuff formed of minced flesh is pushed out from the nozzle 8 in a belt shape and supplied onto the water permeable film 31. The thus supplied belt-shaped food stuff 8 is conveyed by the water permeable film 31 toward the output end.

Figure 5:
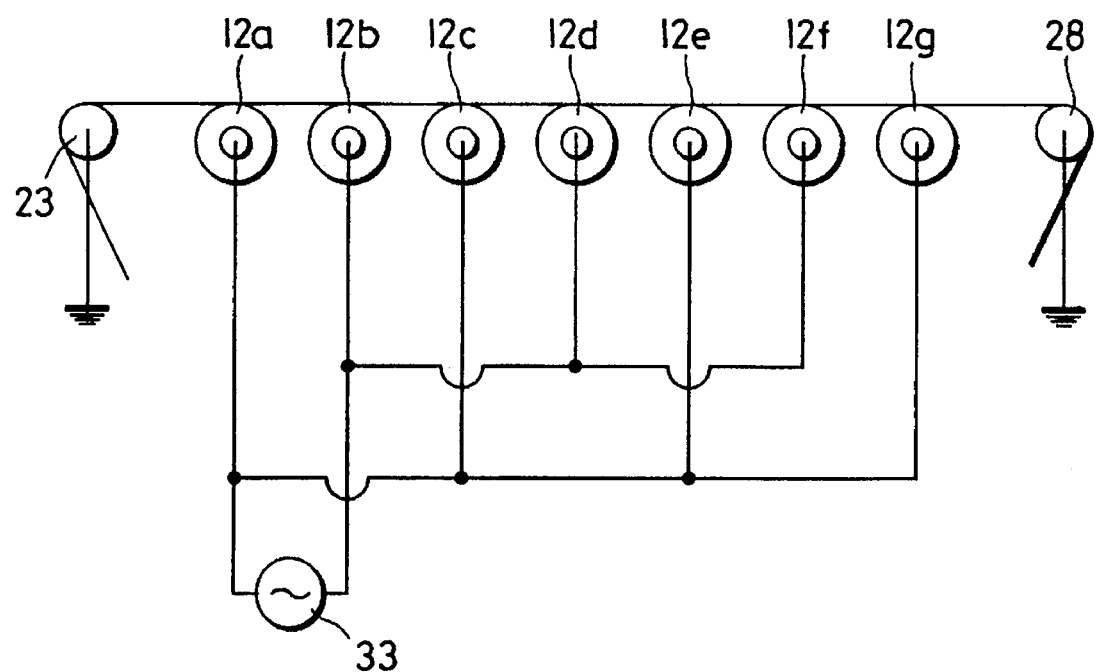
FIG. 5 is a circuit diagram showing a power source circuit for supplying electric power to roller electrodes.

As shown in FIG. 5, roller electrodes 12a, 12c, 12e and 12g out of the seven roller electrodes 12 are connected to one of output terminals of a power source 33 and roller electrodes 12b, 12d and 12f are connected to the other of the output terminals, whereby electric current is caused to flow across a pair of two roller electrodes which are disposed adjacently to each other. As the power source 33, there is used a commercial power source or a high frequency power source on the level of 1 kHz–400 kHz.

When the belt-shaped food stuff B is supplied from the nozzle 8 to a position at the end of carry-in in a belt shape, the water permeable film 31 is moved from the input end to the output end, so that the belt-shaped food stuff B is conveyed toward the out end, while being supported by the water permeable film 31. The electric power is supplied from the power source 33 to the pairs of roller electrodes disposed adjacently to each other, so that the electric current is flowed through the belt-shaped food stuff B. With this arrangement, the belt-shaped food stuff B generates heat due to electric resistance and is heated electrically by Joule heat.

The electric current is flowed through the belt-shaped food stuff B, whereby the belt-shaped food stuff B generates heat due to the electric resistance, so that the belt-shaped food stuff B can be quickly heated to a predetermined temperature as compared with the case where the belt-shaped food stuff B is heated with steam. The belt-shaped food stuff B is conveyed while being supported by the water permeable film 31, so that the belt-shaped food stuff B is prevented from being deformed, prevented from dropping through the spaces formed between the roller electrodes 12 and heated while holding a desirable shape.

The belt-shaped food stuff B is heated until it is moved to a position at the output end of the electrode row 13, and thereafter the belt-shaped food stuff B is supported by another conveyor, not shown, and conveyed to the following process for forming the multitude of slits.

Figure 6:
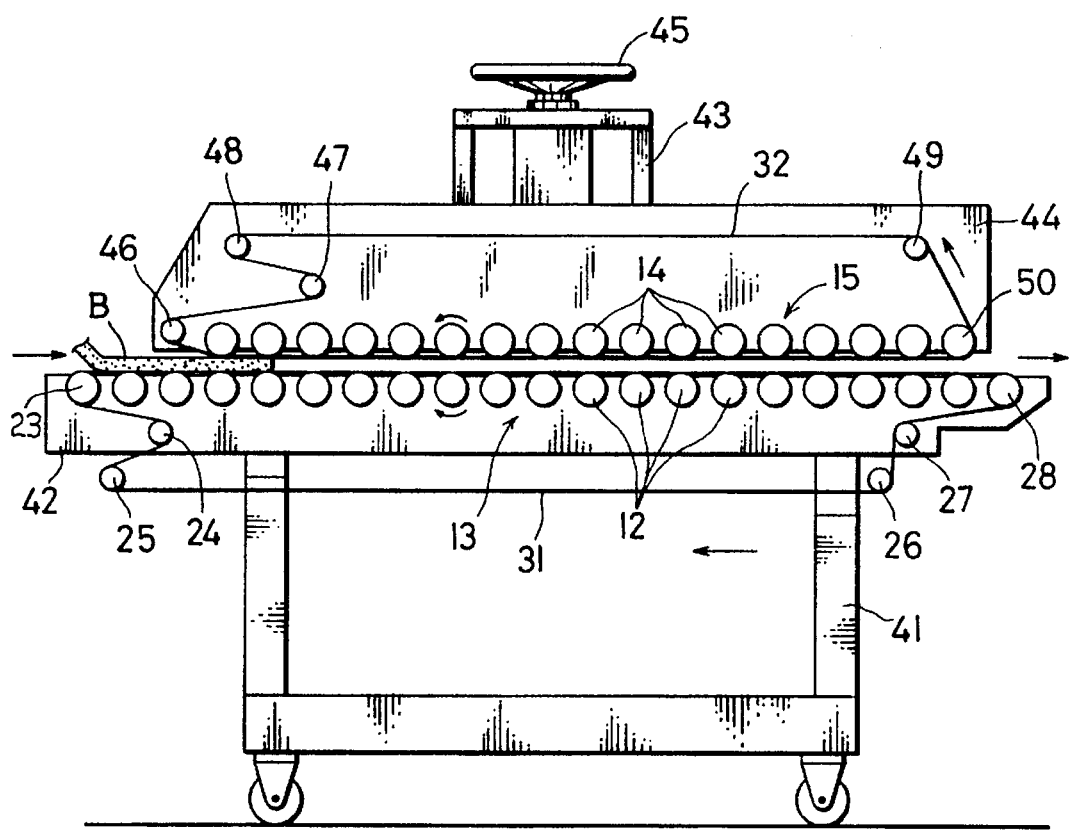
FIG. 6 is an front view showing the system for heating food stuffs as another embodiment of the present invention.
Figure 7:
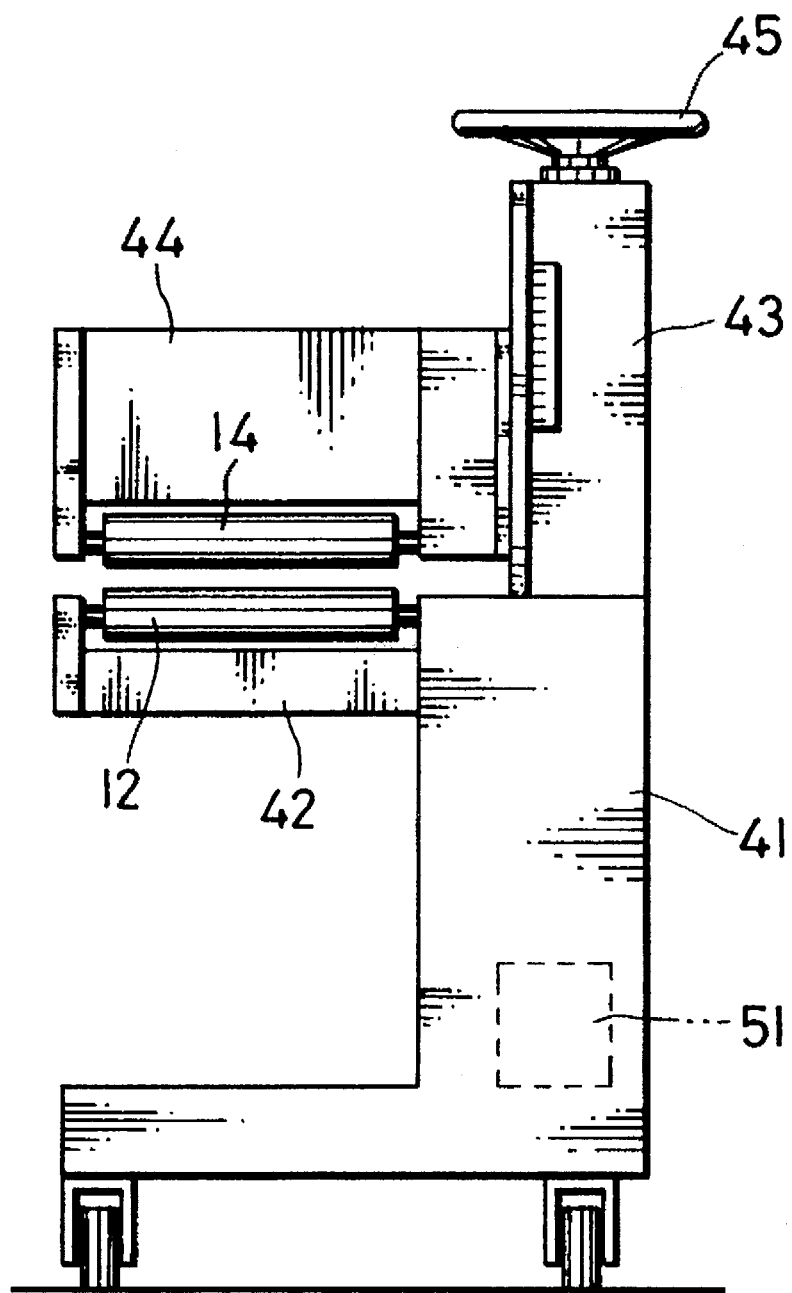
FIG. 7 is a right side view of FIG. 6, FIGS. 8a and 8b are circuit diagrams showing power source circuits for supplying electric power to the roller electrodes of the heating system as shown in FIGS. 6 and 7.
Figure 8A:
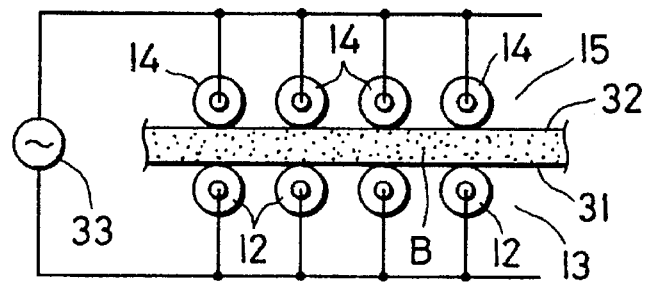

FIGS. 6 to 8 show a system for heating food stuffs as another embodiment of the present invention. This heating system has a base 41, and a bottom side base 42 is fixed to this base 41. Further, a top side base 44 is vertically movably mounted on a column 43 fixed onto the base 41. By operating a handle 45 rotatably provided on the column 43, the top side base 44 can be moved in the vertical direction to adjust its position.

The plurality of roller electrodes 12 each having a columnar outer peripheral surface are rotatably mounted on the bottom side base 42 about a horizontal shaft, whereby a first electrode row 13 is constituted by these roller electrodes 12. Roller electrodes 14 each having a columnar outer peripheral surface similarly to the roller electrodes 12 are rotatably mounted on the top side base 44 in parallel to one another, whereby a second electrode row 15 is constituted by these roller electrodes 14.

When the top side base 44 is vertically moved by use of the handle 45 with respect to the bottom side base 42, a space formed between the first electrode row 13 and the second electrode row 15 is adjusted, so that the thickness of the food stuff is set.

As shown in FIG. 6, the water permeable film 31 having a width substantially corresponding to the length of the roller electrode 12 is racked across the first electrode row 13 and the guide rollers 23 to 28, and a belt-shaped water permeable film 32 having a width substantially corresponding to the length of the roller electrode 14 is racked across the second electrode row 15 and the guide rollers 46 to 50. The respective water permeable films 31 and 32 are endless, so that they can convey the belt-shaped food stuffs B and can prevent the food stuffs from dropping through the spaces formed between the roller electrodes 12.

As shown in FIG. 6, the first electrode row 13 at the lower side is longer than the second electrode row 15 at the upper side, and the opposite end portions of the first electrode row 13 are pushed more outwardly than the second electrode row 15. When the food stuff B is rested on an end portion at the left side in FIG. 6, the food stuff B is conveyed from the left side to the right side in FIG. 6 by driving the first electrode row 13 and the second electrode row 15.

In order to convey the food stuffs B, a motor 51 as being a driving means is assembled into the base 41 for example, and the roller electrodes 12 and 14 are driven by this motor 51. In short, the roller electrodes 12 of the first electrode row 13 and the roller electrodes 14 of the second electrode row 15 are driven by the one motor 51 in synchronism with each other.

The roller electrodes 12 at the lower side and the roller electrodes 14 in association therewith form pairs with each other, and the power source 33 is connected to the respective pairs.

When the food stuff B is thrown into a position at the input end as shown in FIG. 6, the food stuff is conveyed to the right by the driving of the motor 51. During this conveying process, the electric current is flowed through the pair of the roller electrodes 12 and 14, the electric current is flowed through portions of the food stuff B, which are in contact with the roller electrodes 12 and 14. As the food stuff B is conveyed, the portions, through which the electric current is flowed, move toward the both roller electrodes of the following pair at the downstream side. As described above, as for the portions of the food stuff B, a period of time, during which the electric current is flowed through the portions for heating them, and a period of time, during which the heating is made not so much, are repeated during the conveying process.

Figure 8B:
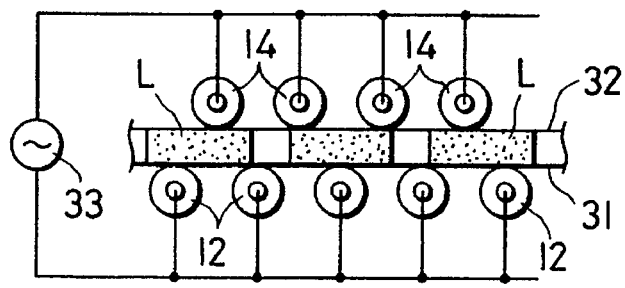

In the heating system shown in FIG. 6, there are provided the roller electrodes 12 and the roller electrodes 14 at the same position in the conveying direction. However, as shown in FIG. 8b, the respective roller electrodes 12 and 14 may be shifted from each other in the conveying direction. Furthermore, the food stuff B is heated in the heating system shown in FIG. 6. However, as shown in FIG. 8b, a food stuff L which has been formed to provide a bamboo leaf may be heated.

Figure 9:
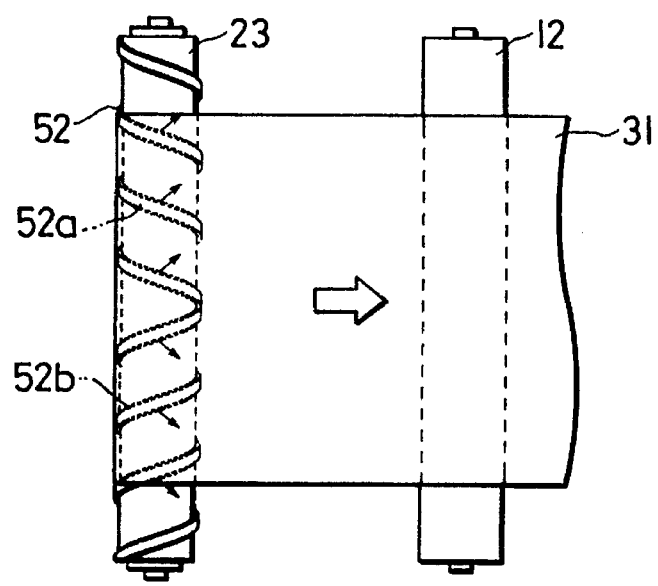
FIG. 9 is a plane view showing a guide roller as being a modified example.

FIG. 9 shows a modified example of the guide roller 23 shown in FIGS. 3 and 6. A spirally raised portion 52 is formed on the outer peripheral surface of this guide roller 23, and a raised portion 52a directed from the central portion to one end portion of the guide roller 23 and a raised portion 52b directed to the other end portion are opposite to each other. With this arrangement, by the rotation of the guide roller 23, a tensile force acts for expanding the water permeable film 31 from the central portion to opposite end portions of the widthwise direction, so that the water permeable film can be prevented from being wrinkled.

FIGS. 10 to 13 show a system for heating the itatsuki-kamaboko. The itatsuki-kamaboko is formed such that kamaboko Q made of minced paste is mounted onto a rectangular plate W, and this kamaboko Q is heated.

Figure 10:
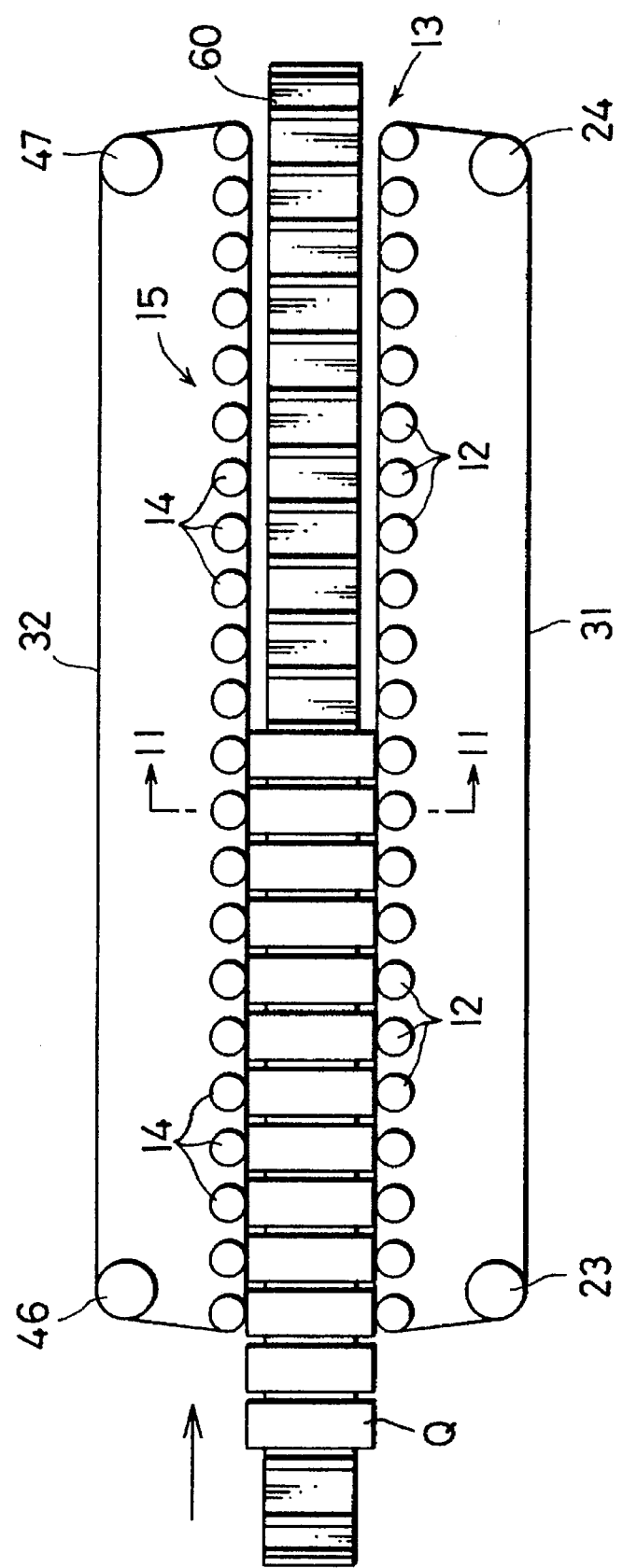
FIG. 10 is a plane view showing the system for heating food stuffs as a further embodiment of the present invention.
Figure 12:
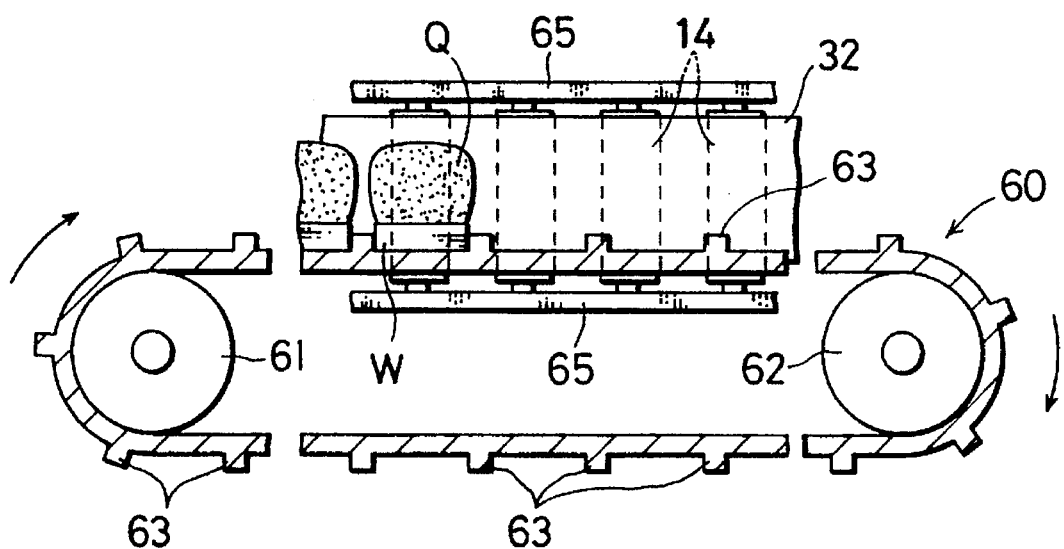
FIG. 12 is a sectional view taken along the line 12—12 in FIG. 11.

As shown in FIG. 10, in this heating system, the itatsuki-kamaboko are rested on a belt conveyor 60 at predetermined intervals and conveyed. As shown in FIG. 12, this belt conveyor 60 is racked across two pulleys 61 and 62, and one of the pulleys is set at the driven side and driven by the rotation of a motor, not shown. The food stuffs are conveyed into the belt conveyor 60 by a conveying device, not shown, automatically, or by the manual operation of a worker. In order to dispose the kamaboko Q on the belt conveyor 60 at predetermined intervals, stoppers 63 each extending in the widthwise direction of the belt conveyor 60 may be provided at predetermined intervals. By resting the kamaboko Q on the belt conveyor 60, the kamaboko being in the horizontal state is conveyed from the input side at the left end portion to the right as seen in FIG. 10.

As shown in FIG. 10, the first electrode row 13 and the second electrode row 15 are provided on opposite sides of the belt conveyor 60, the first electrode row 13 is constructed by arranging the plurality of roller electrodes 12 at predetermined intervals in the vertical direction and the second electrode row 15 is constructed by arranging the plurality of roller electrodes 14 at predetermined intervals in the vertical direction. The respective roller electrodes 12 and 14 are disposed such that the outer peripheral surfaces thereof are in contact with the end faces of the kamaboko.

Figure 11:
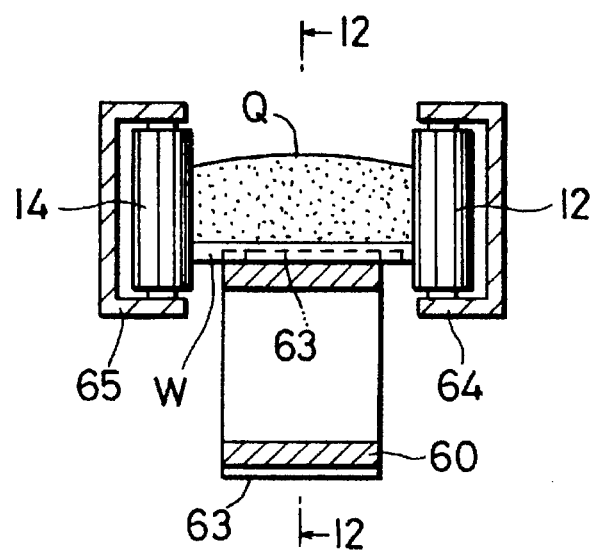
FIG. 11 is a sectional view taken along the line 11—11 in FIG. 10.

As shown in FIG. 11, the roller electrodes 12 and 14 are rotatably mounted on the support members 64 and 65, respectively. In FIG. 10, these support members 64 and 65 are omitted.

As shown in FIG. 10, the water permeable film 31 is racked across the first electrode row 13 through the guide rollers 23 and 24, and the water permeable film 32 is racked across the second electrode row 15 through the guide rollers 46 and 47. The respective water permeable films 31 and 32 are constructed by the same members as shown in the above-described embodiment and water is supplied thereto.

Figure 13:
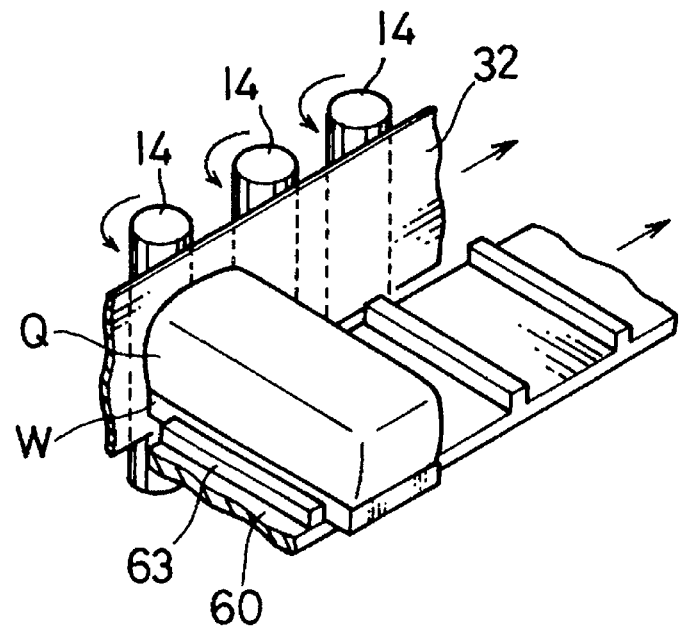
FIG. 13 is a partially omitted oblique view showing the positional relationship between the food stuff, the roller electrodes and the water permeable film.

The roller electrodes 12 and the roller electrodes 14 which are opposed in the widthwise directions and make the pairs with each other, are in contact with the respective kamaboko at the same time. When the belt conveyor 60 is moved in a direction indicated by an arrow in FIG. 14, the opposite end faces of the kamaboko Q as shown in FIG. 13 are brought into a state of being clamped by the respective pairs of the roller electrodes 12 and 14 and repeatedly heated electrically.

Figure 14:
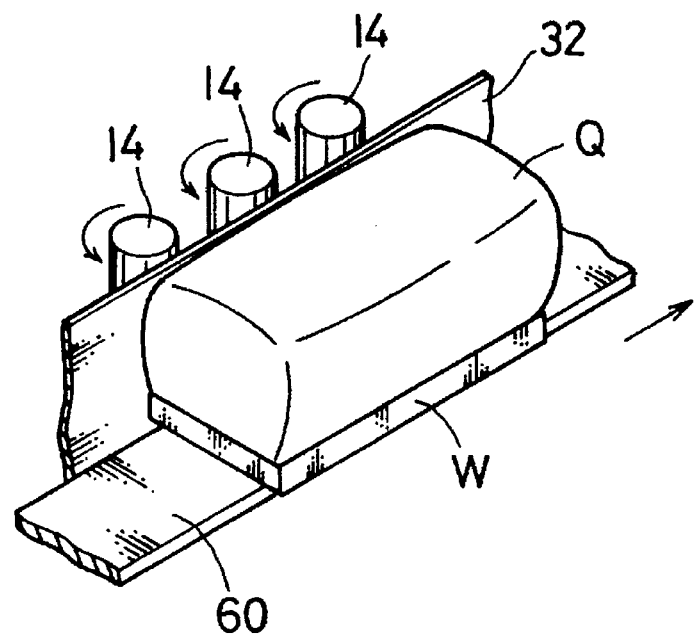
FIG. 14 is a partially omitted oblique view showing the positional relationship between the food stuff, the roller electrodes and the water permeable film, in another method of conveying shown in FIG. 10.

FIG. 14 is the drawing showing another method of conveying the kamaboko by use of the system for heating the food stuffs as shown in FIGS. 10 to 13. In this case, the kamaboko is rested on the belt conveyor 60 such that the longitudinal direction of the kamaboko coincides with the conveying direction. In this case, the stoppers 63 are not provided on the belt conveyor 60, and, even in the heating system as shown in FIGS. 10 to 13, the stoppers 63 may not be provided.

In the heating system as shown in FIGS. 10 to 14, the belt conveyor 60 is used as the conveying means. However, as the conveying means, a roller conveyor may be used, or a caterpillar-shaped conveyor, in which a multitude of plate members are secured to a roller chain, may be used.

As has been described hereinabove, detailed description has been given of the invention invented by the present inventor with reference to the embodiment. However, the present invention should not necessarily be limited to the above-described embodiment, and needless to say that the present invention may be modified variously within the scope not departing from the gist.

For example, as the food stuffs to be heated and sterilized, there are paste food stuffs utilizing fish meats, livestock meats, agricultural products, noodles, sea weeds and the like, and food stuffs which are gelled when heated, like eggs and the like. Furthermore, the water permeable films 31 and 32 are endless shapes. However, the water permeable films 31 and 32 may be previously wound around wind-up rollers and may be conveyed while the films are wound up around the wind-up rollers.

The invention claimed is:

1. A system for heating food stuffs, such as a paste food stuff formed by mincing, as such food stuffs are moved along a heating path having input and output ends, said system comprising:

a means for supplying food stuffs to said input end of said heating path;

a means for moving food stuffs along said heating path from said input end to said output end of said heating path;

a plurality of roller electrodes each having an outer peripheral portion formed of an electrically conductive material, said electrodes being arranged to form at least one roller electrode row extending along said heating path with the electrodes of said one row being disposed at predetermined intervals in parallel to one another along said heating path;

a water permeable film trained across said roller electrodes of said one roller electrode row and movable with said food stuffs along said heating path, said film having a first side face directly contacting said outer peripheral portions of said roller electrodes of said one electrode row and having a second side face directly contacting said food stuffs;

a power source for supplying electric power to said roller electrodes; and a means connecting said power source to said outer peripheral portions of said roller electrodes so that electric current is flowed between pairs of said electrodes with the current path between each of said pairs of electrodes extending through said water permeable film and said food stuffs to cause said food stuffs to generate Joule heat for heating.

2. A heating system as set forth in claim 1, wherein said food stuffs supplied to said input end of said heating path are of a belt shape.

3. A heating system as set forth in claim 1, wherein said food stuffs are formed to provide predetermined shapes which are supplied to said input end of said heating path by said supplying means.

4. A system for heating food stuffs, such as a paste food stuff formed by mincing, as such food stuffs are moved along a heating path having input and output ends, said system comprising:

a means for supplying food stuffs to said input end of said heating path;

a means for moving food stuffs along said heating path from said input end to said output end of said heating path;

a plurality of roller electrodes each having an outer peripheral portion formed of an electrically conductive material, said roller electrodes being arranged to form first and second roller electrode rows extending in spaced parallel relationship to one another along said heating path with the electrodes of each of said rows being disposed at predetermined intervals in parallel to one another along said heating path;

a first water permeable film trained across said roller electrodes of said first roller electrode row and movable with said food stuffs along said heating path, said first film having a first side face directly contacting said outer peripheral portions of said roller electrodes of said first electrode row and having a second side face directly contacting said food stuffs;

a second water permeable film trained across said roller electrodes of said second roller electrode row and movable with said food stuffs along said heating path, said second film having a first side face directly contacting said outer peripheral portions of said roller electrodes of said second electrode row and having a second side face directly contacting said food stuffs;

a power source for supplying electric power to said electrodes; and a means connecting said power source to said outer peripheral portions of said electrodes so that electric current is flowed between pairs of said electrodes with the current path between each of said pairs of electrodes extending through said first and second water permeable films and through said food stuffs to cause said food stuffs to generate Joule heat for heating.

5. A heating system as set forth in claim 4, wherein said food stuffs supplied to said input end of said heating path are of a belt shape.

6. A heating system as set forth in claim 4, wherein said food stuffs are formed to provide predetermined shapes which are supplied to said input end of said heating path by said supplying means.

7. A heating system as set forth in claim 4, wherein the roller electrodes of said first roller electrode row and the roller electrodes of said second roller electrode row are disposed in the vertical directions, respectively, and a conveyor for conveying the food stuffs is disposed downwards of a space formed between the respective roller electrode rows.

8. A heating system as set forth in claim 7, wherein each of said food stuffs is an itatsuki-kamaboko mounted onto a plate.

9. A system for heating food stuffs as set forth in claim 1, wherein said roller electrodes of said one row comprise a total of at least three electrodes;

said power source has first and second terminals; and said means connecting said power source to said outer peripheral portions of said electrodes is a first means connecting the outer peripheral portions of every other one of said electrodes in the direction along said heating path to said first terminal and a second means connecting the outer peripheral portions of the remaining ones of said electrodes of said one row to said second terminal.

10. A system for heating food stuffs as set forth in claim 9, wherein the number of said roller electrodes in said one electrode row is an odd number, so that the two of said roller electrodes located at the opposite ends of said one electrode row have the same electrical polarity.

\* \* \* \* \*